Patented Oct. 5, 1954

2,691,026

UNITED STATES PATENT OFFICE 2,691,026

PROCESS FOR THE PREPARATION OF ACETAL ESTERS

James Lake Harvey, New Castle, Del., assignor to Atlas Powder Company, Wilmington, Del., a corporation of Delaware No Drawing. Application March 30, 1951, Serial No. 218,549

5 Claims. (Cl. 260—340.7)

This invention relates to a chemical process. More specifically it relates to a novel process for the preparation of a higher fatty acid ester of a cyclic acetal.

It is the object of this invention to provide a novel and improved process for the preparation of a higher fatty acid ester of alkylol substituted 1,3-dioxolanes and alkylol substituted 1,3-dioxanes.

The preparation of cyclic acetals of the 1,3-dioxolane and 1,3-dioxane types by the reaction of ketones or aldehydes with polyols in the presence of catalyst is well known. Furthermore, where cyclic ketals of this type contain unsubstituted hydroxyl groups they may be esterified by processes such as described in the United States Patent to Marple No. 2,312,298. Similar cyclic esters may be formed by reacting a ketone with a polyol substituted ester. The term "acetal" as used herein is intended to include the condensation product of a polyol with either an aldehyde or a ketone.

In accordance with the present invention it has been found that a higher fatty acid ester of an alkylol substituted 1,3-dioxolane or an alkylol substituted 1,3-dioxane can be formed directly, in one step, by the condensation of a polyol containing at least three hydroxyls, a ketone or aldehyde and a higher fatty acid in the presence of an acid acting catalyst without the separation or even intermediate formation of either the alkylol substituted cyclic acetal or the polyol substituted ester.

Compounds of the type formed according to the present invention are useful as intermediates in the prepaartion of other organic compounds such as the monoglycerides of the higher fatty acids. They are also useful as solvents, plasticizers, and surface active agents.

The process of the present invention is conveniently performed by refluxing a polyol containing at least three hydroxyls, a ketone or aldehyde and a higher fatty acid in the presence of an acid acting catalyst at atmospheric pressure. Pressures higher or lower than atmospheric may be employed, frequently with the advantages of facilitating condensation and/or improving the removal of water formed during the reaction. If the ketone is water immiscible, it may be used in excess to promote azeotropic removal of the water formed. Other water immiscible solvents with suitable boiling points such as toluene, xylene and the like, are likewise suitable in this role.

Glycerol and higher polyols containing three or more hydroxyls are amenable to the process. Among such aliphatic polyols which are suitable may be mentioned glycerol, pentaglycerol, the tetritols, the pentitols, the hexitols, such as sorbitol, mannitol and dulcitol, hexane pentols and the like. Furthermore, ethers and inner ethers such as polyglycerol and the hexitans, sorbitan and mannitan may be used.

The polyhydric aliphatic alcohol may be reacted with any saturated aliphatic aldehyde or saturated aliphatic, or carbocyclic ketone or any mixed saturated aliphatic carbocyclic unsubstituted ketone. Those boiling above 90° C., are preferable when operating at atmospheric pressure. Among such ketones are included the dialkyls such as dimethyl, diethyl, dipropyl, diisopropyl, dibutyl, diisobutyl, diamyl, methylethyl, methylpropyl, methylisopropyl, methylbutyl, methylisobutyl, methyl-t-butyl, methylamyl, ethylpropyl, ethylbutyl, ethylisoamyl, propylisobutyl ketone, tridecanone, and carbocyclic ketones such as cyclopentanone, and cyclohexanone and mixed aliphatic carbocyclic ketones such as cyclohexylmethyl, cyclohexylpropyl and the like. Suitable aldehydes include butanal, pentanal, hexanal, heptanal and the like. In general such compounds may be expressed by the formula:

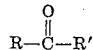

wherein R is a saturated hydrocarbon radical, R' represents R or hydrogen and R and R' may join in ring formation.

The acids which may be employed include all of the long chain fatty acids and mixtures of fatty and rosin acids. Those fatty acids containing 11 to 20 carbons are preferred. Among these may be mentioned hendecanoic, lauric, myristic, palmitic, stearic, arachidic, oleic, linoleic, and the like. Furthermore, mixtures of fatty acids such as those obtained by the saponification of natural fats and oils may be used as well as mixtures of fatty and rosin acids such as occur in tall oil.

The reaction is performed in the presence of an acid-acting catalyst. Hydrocloric acid, phosphoric acid, p-toluene-sulphonic acid, zinc chloride, potassium bisulfate, iodine and others may be used. As little as 0.25% catalyst based on total charge has been found effective. Larger amounts of catalyst, up to 1%, may be used without detrimental effect. Since it is well known that 1,3-dioxolanes and 1,3-dioxanes are decomposed by high acid concentrations, too great an excess of acid catalyst must be avoided.

The following examples are cited to illustrate the invention. They are not intended to limit it in any manner.

Example I

A three-necked round bottom reaction flask equipped with two Barrett receivers and an agitator is charged with 263 grams (2.77 mols) of 95% glycerol, 540 grams (5.40 mols) of methyl isobutyl ketone, 710 grams (2.50 mols) of stearic acid and 18 grams (1.0% based on total charge) of 85% phosphoric acid. The mixture is refluxed with stirring for a period of 12 hours. The excess ketone employed serves to remove water of condensation formed in the reaction mixture. A yield of 35.7% of the stearic acid ester of 2-methyl - 2 - isobutyl - 4 - methylol-1,3-dioxolane, based on stearic acid charged, is obtained. The product boils at 189° C. under 0.05 mm. pressure.

Example II

The equipment described in Example I is charged as follows:

Glycerol (95%) _____ 465 grams (4.8 mols)
Cyclohexanone _____ 588 grams (6 mols)
Stearic acid _____ 1136 grams (4 mols)
Phosphoric acid (85%) ___ 13 grams (0.5% based on total charge)

This charge is refluxed for a period of two hours and gives a yield of 65% of the stearic acid ester of 2,2-pentamethylene-4-methylol-1,3-dioxolane boiling at 210° C., under 0.1 mm. pressure.

Example III

A 52.9% yield of the stearic acid ester of 2-methyl-2-ethyl-4-methylol-1,3-dioxolane boiling at 198° C., under 0.6 mm. pressure is obtained by refluxing the following charge for a period of 8½ hours in equipment similar to that used above:

Glycerol (95%) _____ 96.8 grams (1.0 mol)
Methylethyl ketone _____ 86.5 grams (1.2 mols)
Stearic acid _____ 284 grams (1.0 mol)
Isopropyl ether _____ 55.0 grams
p-Toluenesulfonic acid__ 2.0 grams (0.4% based on total charge)

Example IV

A three-necked round bottom reaction flask equipped with two Barrett receivers and an agitator is charged with 116.2 grams (1.2 mols) of 95% glycerol, 90.5 grams (1.26 mols) of butyraldehyde, 281.5 grams (1.0 mol) of stearic acid, 55.0 grams of isopropyl ether and 1.8 grams (0.3% based on total charge) of 85% phophoric acid. At the end of 20.8 hours an 80.7% yield of the stearic acid ester of 2-propyl-4-methylol-1,3-dioxolane is obtained. The product boils at 184° C. under a pressure of 0.15 mm.

Example V

A 55.5% yield of the oleic acid ester of 2,2-pentamethylene-5-methyl-5-hydroxymethyl-1,3-dioxane was obtained by refluxing the following charge for 2½ hours in equipment similar to that used above:

Pentaglycerol _____ 144.0 grams (1.2 mols)
Oleic acid _____ 282.5 grams (1.0 mol)
Cyclohexanone _____ 196 grams (2.0 mols)
Phosphoric acid (85%) __ 3.1 grams (0.5% based on total charge)

The product distilled at 228° C. at 0.3 mm. pressure.

Many other modifications within the scope of this invention will be apparent to those skilled in the art.

What is claimed is:

1. A process for the production of a higher fatty acid ester of an acetal which comprises condensing in the presence of an acid acting catalyst a saturated, unsubstituted aliphatic polyol containing at least three hydroxyl groups with a higher fatty acid and a carbonyl bearing organic compound of the formula:

wherein R represents a saturated hydrocarbon radical, R' is a member of the class consisting of R and hydrogen, and when R' is not hydrogen R and R' may join in ring formation.

2. The process as defined in claim 1 wherein the polyol is glycerine.

3. The process as defined in claim 1 wherein the polyol is pentaglycerol.

4. The process as defined in claim 1 wherein the carbonyl bearing organic compound is a ketone.

5. The process as defined in claim 1 wherein the carbonyl bearing organic compound is an aldehyde.

References Cited in the file of this patent

UNITED STATES PATENTS

| Number | Name | Date |
|---|---|---|
| 2,312,298 | Marple | Feb. 23, 1943 |

FOREIGN PATENTS

| Number | Country | Date |
|---|---|---|
| 559,451 | Great Britain | Feb. 21, 1944 |

OTHER REFERENCES

Hibbert, J. A. C. S., vol. 37, July-Dec. 1951. (1748-63).